Patented Aug. 4, 1925.

1,548,776

UNITED STATES PATENT OFFICE.

ANNA PETRONELLA CRAMER-VAN DEVENTER, OF BUITENZORG, JAVA, DUTCH EAST INDIES.

PROCESS FOR PRESERVING OR PROTECTING SUBSTANCES OR OBJECTS.

No Drawing.   Application filed September 28, 1923.   Serial No. 665,475.   REISSUED To all whom it may concern:

Be it known that I, ANNA PETRONELLA CRAMER-VAN DEVENTER, subject of the Queen of the Netherlands, residing at Buitenzorg, Java, Dutch East Indies, have invented certain new and useful Improved Processes for Preserving or Protecting Substances or Objects, of which the following is a specification.

It is known to preserve food and other substances and also to protect divers articles against contamination by the influence of the atmosphere by covering them with a thin air-excluding film. This method is very suitable for preserving food and the like, in cases where neither heat nor chemical means can be applied, e. g. when fresh fruits are to be protected from drying or when eggs are to be preserved.

It has been proposed to preserve eggs by applying thereto a solution of rubber, gutta-percha or balata, to which may be added wax, ceresine or japan wax. However, to obtain solutions of rubber, organic solvents are necessary, all of which are very viscous in relatively weak solutions. This is troublesome when applying same. Moreover, such organic solvents have a very bad effect on the smell, and the taste or the condition, or both of most products to be preserved.

The present invention relates to a method of preserving or protecting substance by means of a rubber film which excludes the air and which avoids the said drawbacks. In some cases it is difficult to obtain a film that really excludes the air, because the usual film-forming substances are injuriously affected by the very substances which are to be preserved (e. g. sealing-wax on bottles filled with concentrated alcohol). According to my invention, an impenetrable coating can be obtained in such cases in a simple way. The invention consists in the use of latex of rubber bearing plants to coat the articles to be protected, by first applying a film of the liquid latex and subsequently causing same to become solid, e. g. by causing it to dry up. The whole treatment can take place at ordinary temperature. As such coating is an aqueous emulsion, it may be applied even to very delicate objects, such as fresh fruits. The latex forms a thin coating, which closely conforms to the surface of the articles. This coating hardens into a thin impenetrable film, which wholly covers an object or article or the parts of it to be protected. Thus on the one hand a very resistant coating is obtained, whilst on the other hand heat treatment or an impairing treatment with chemicals, which might have a bad influence on the taste or on other properties, is avoided.

In carrying out the process the following should be taken into account:

(a.) *Choice of the latex.*—Different kinds of latex can be used for coating, and they can be obtained from different kinds of plants, such as Euphorbiaceæ, Moraceæ, Sapotaceæ, etc.

(b.) *Preparation of the latex.*—After being obtained from the plant, the latex is passed through a sieve and is kept liquid as far as possible by means of a preserving agent (e. g. ammonia). The further treatment depends on the nature of the article to be coated. In case the coating is to be applied for instance to the mouth of a corked bottle similarly to sealing wax, no further treatment of the latex is required. When the latex is to be applied as an impenetrable film to food, all substances which emit a smell are first removed from the latex as much as possible. If the film is to be very thin, the latex is diluted beforehand. In other cases a pigment or a filling material or a disinfecting agent may be added.

(c.) *Preparation of the article to be coated.*—This is cleaned and brushed with a disinfecting agent if necessary.

(d.) *Application of the latex to the article.*—This is effected by means of a pencil-brush, a glass rod or simply by the finger, or the article to be coated may be immersed in the latex; in all these cases it is advisable to suspend the article by means of a thread, so that during the treatment the article itself need not be touched.

The coating also may be applied by first spreading the latex to form a film, causing it to coagulate and then wrapping up the article in the fleece thus obtained. A thin film of liquid latex may be subsequently applied to enclose the article and the loose coating together.

In case it is difficult to exclude wholly the air from an article, more than one coating of latex may be applied and other substances, e. g. pigments, fibres or other substances to strengthen the film may be included in the coating.

(e.) *Hardening of the film.*—This is attained by causing the latex to dry. The drying latex often remains sticky at first and so adheres to the fingers when newly coated articles are touched. This may be prevented by dusting the coating with talc or by causing the film to harden by chemical means.

(f.) *Subsequent sterilization.*—The articles enclosed in dried latex may be cooked in that state. In most cases a second sterilization is superfluous, and with many products, such as fresh fruits, eggs and the like, quite impossible.

(g.) *Preparation for consumption.*—When it is necessary to remove the latex film, e. g. before consuming fruits thus treated, one has only to tear off the fleece by hand; this operation can be facilitated by attaching a thread to the latex.

The advantages of applying an impenetrable coating to articles by means of rubber latex are the following:

1. It can very easily be applied, no expensive means are required and it may be applied on a small scale.
2. The coating does not affect the article to be coated, it does not injure the taste nor does it penetrate into the article and it can be applied at ordinary temperature.
3. The coating fortifies the skin of the article, which effect may be increased by including fibres in the latex.
4. The coating is flexible and so will not chip or crack when the shape of the article is altered (which may be the case with soft articles).
5. The coating is impenetrable; hence in case the article has a fragile skin; its contents will not be exposed to the influence of the air when the skin is injured (which may be the case with eggs for instance).
6. The coating is not affected by high temperatures, not even if these are much higher than the boiling point of water; it is not affected by acids, concentrated alcohol or humidity, nor can it be injured by mould or mildew, bacteria or insects.
7. When once the coating has hardened, it can no longer be dissolved by fresh liquid latex, so that a coating when once applied to an article, cannot be destroyed when the treatment is repeated.
8. If required the coating can easily be removed from the article without leaving any trace on it.

Liquid latex compares favourably with all other coating means because of the favourable properties mentioned, especially those mentioned in the clause 2 above, in combination with those mentioned in clauses 6 and 7, and further those mentioned in clauses 4 and 8. Hence, it is especially adapted for coating articles (in order to prevent drying up and contamination) such as, for example, fresh fruit, eggs, cheese and the like, that would neither stand a drastic treatment with disinfecting agents, nor a heat treatment, nor the application of a coating which must be applied in a hot condition or dissolved in organic or corrosive liquids.

Moreover it has been found that corncobs when treated with latex are not injured by cornweevils and that cock-roaches do not injure photographs which have been coated with latex.

The invention may be applied to many kinds of articles.

What I claim is:

1. A process for preserving or protecting objects comprising the step of applying an air-excluding fleece-like film of latex to the object under treatment.
2. A process for preserving or protecting objects, comprising the step of coating the object under treatment with liquid latex to form an air-excluding film thereon.

In testimony whereof I affix my signature.

ANNA PETRONELLA CRAMER-van DEVENTER.